May 10, 1949.     E. M. DAVIS     2,469,953
DEFEATHERING POULTRY

Filed Sept. 8, 1944     2 Sheets-Sheet 1

ATTEST-

Elmer M. Davis
INVENTOR.

BY

ATTORNEY

May 10, 1949. E. M. DAVIS 2,469,953
DEFEATHERING POULTRY
Filed Sept. 8, 1944 2 Sheets-Sheet 2
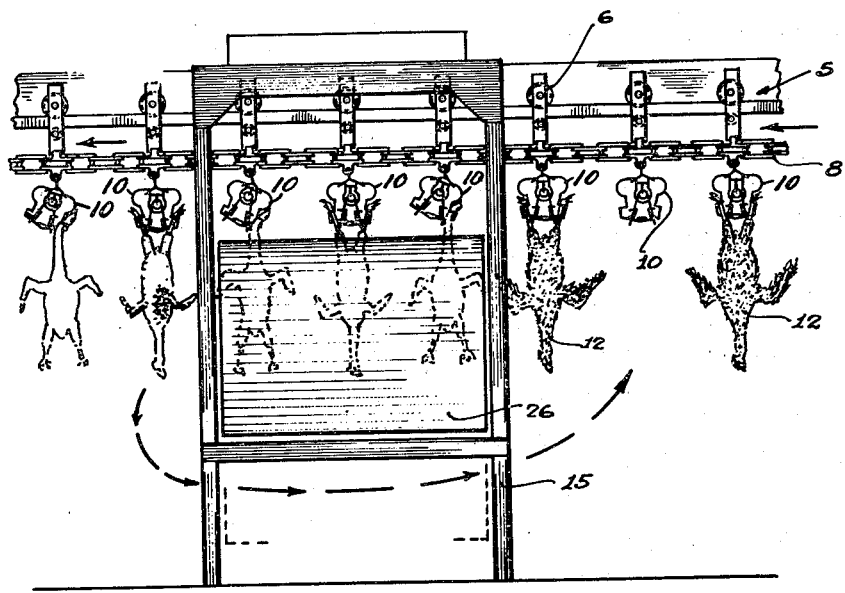
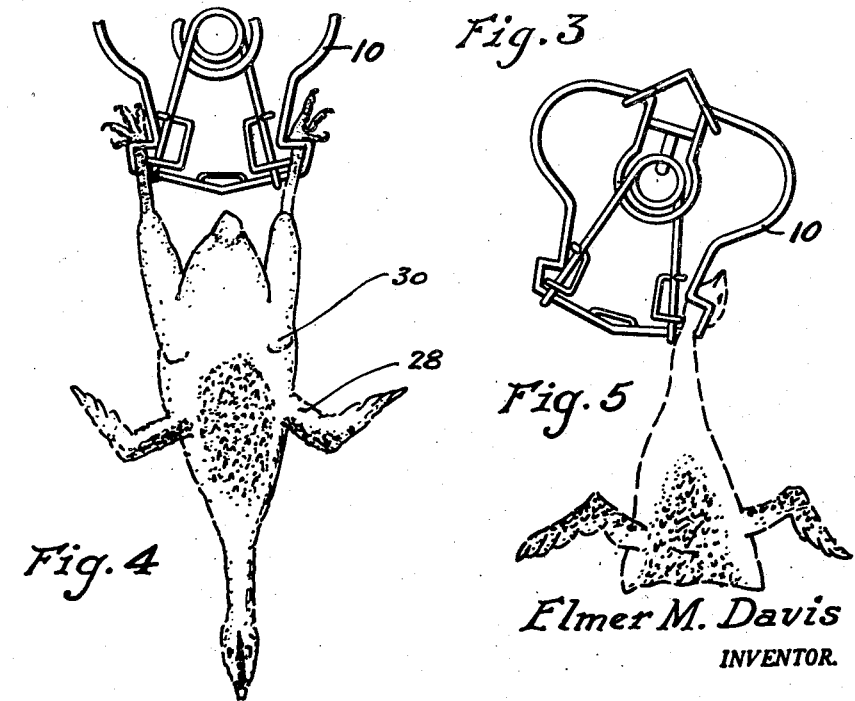
Elmer M. Davis
INVENTOR.

Patented May 10, 1949

2,469,953

UNITED STATES PATENT OFFICE 2,469,953

DEFEATHERING POULTRY

Elmer M. Davis, St. Paul, Minn., assignor to Swift & Company, Chicago, Ill., a corporation of Illinois Application September 8, 1944, Serial No. 553,185

11 Claims. (Cl. 17—45)

This invention relates to the picking of poultry and has to do particularly with an improved process for removing the feathers from poultry using mechanical picking means.

In commercial poultry plants, it is customary to dress the poultry on a continuous dressing line. The poultry pass through the various dressing operations suspended from shackles attached to a continuous conveyor. The poultry, such as chickens, turkeys and other fowl, are first suspended by the legs from the shackles and subjected to the various dressing operations, including killing, scalding, defeathering, singeing, removing the craw, washing, etc. It is desirable to suspend the birds from the feet with their heads down so that they will bleed thoroughly when killed and stuck. Immediately after killing and bleeding, the birds are scalded in hot water to open up the pores and loosen the feathers. The hot scalded birds are immediately passed through a mechanical picking machine which removes the bulk of the feathers. The plucked fowl are then dried in a drying tunnel and dipped in a defeathering wax to form on the surface of the fowl a wax coating which immediately congeals to a plastic solid. The wax is then peeled off the birds along with the remaining feathers and hairs which are retained in the removed wax coating.

In the above described operations much manual labor is required, particularly in removing the wax and pulling out a certain amount of feathers which are not removed by the mechanical picker. The process also requires a large amount of mechanical equipment. Furthermore, in removing the wax, it is very difficult to avoid leaving small particles of the wax on the surface of the fowl. These particles of wax may be the source of complaints from the consumers.

An object of the present invention is to provide an improved method of picking poultry.

Another object of the invention is to simplify the equipment and operations involved in defeathering poultry.

A further object of the invention is to eliminate the use of wax in defeathering poultry.

Also, an object of the invention is to provide a method of defeathering poultry whereby the poultry may be completely defeathered by mechanical pickers.

Other objects of the invention will become apparent from the following description of the process and apparatus for performing the invention.

The present invention contemplates broadly a method of picking scalded poultry involving the following steps: First mechanically picking the poultry while suspended from the feet with the head down, and second, mechanically picking the poultry again while the bird is suspended from the head with the feet down. In each step substantially the entire body of the poultry is subjected to the mechanical picking means.

It has been found that when the scalded poultry is subjected to the action of a mechanical picking machine while suspended from the feet that a portion of the body of the poultry is not thoroughly contacted by the picking means of the picking machine. For example, the back of the poultry and the backs of the wings are protected so that they are not contacted by the picking fingers and as a result a substantial amount of feathers are left on these portions of the body. The commercial mechanical pickers are built on the principle of revolving drums equipped on the circumference with picking means, such as rubber fingers which whip against the body of the poultry and remove the feathers. The picking drums rotate one in clockwise direction and the other in a counterclockwise direction whereby a downward pull is exerted on the feathers. When the birds are suspended from the feet the downward strokes of the fingers are not effective for contacting the back and underside of the wings. Consequently, there are always patches of feathers on the back of each wing and on the back of the bird. The amount of remaining feathers will depend on the type and age of the bird. It is often necessary for a substantial amount of these feathers to be removed by a hand operation as the birds emerge from the picking machine and the remainder finally removed by a waxing operation.

It has further been found, according to the present invention, that the feathers remaining on the birds which have been picked while suspended from the feet may be effectively removed by suspending the birds from the head with the feet down and passing them again through a picking machine. When the birds are suspended from the head the backs of the wings are reversed and are on the upper side. Also, the back of the bird becomes more exposed. Consequently, when the birds are passed through the picking machine suspended from the head, the fingers of the mechanical picker in striking downwardly thoroughly contact the back of the wings and the back of the poultry, removing the remaining feathers. In picking the poultry first against the lay of the feathers and then with the lay of the feathers, the bird is cleaned of substantially all feathers and hair so that manual picking and waxing operations may be eliminated, and it is often unnecessary to singe the poultry. Furthermore, this double action of the picking machine produces a white, rough finish on the surface of the carcass.

The invention will be more fully understood from the following description read in connection with the accompanying drawing.

Figure 3 is another embodiment of the invention showing a single picking machine in connection with which the birds which have passed once through the machine are reversed so that they are suspended from the head and passed through the same machine.

Figure 4 is an enlarged view of a bird which has passed through the picking machine suspended from the feet, showing the unremoved feathers on the back and on the lower sides of the wings.

Figure 5 is an enlarged view of a bird suspended by the head from the shackle disclosed in the De Vout Patent 2,035,948.

Figure 1:
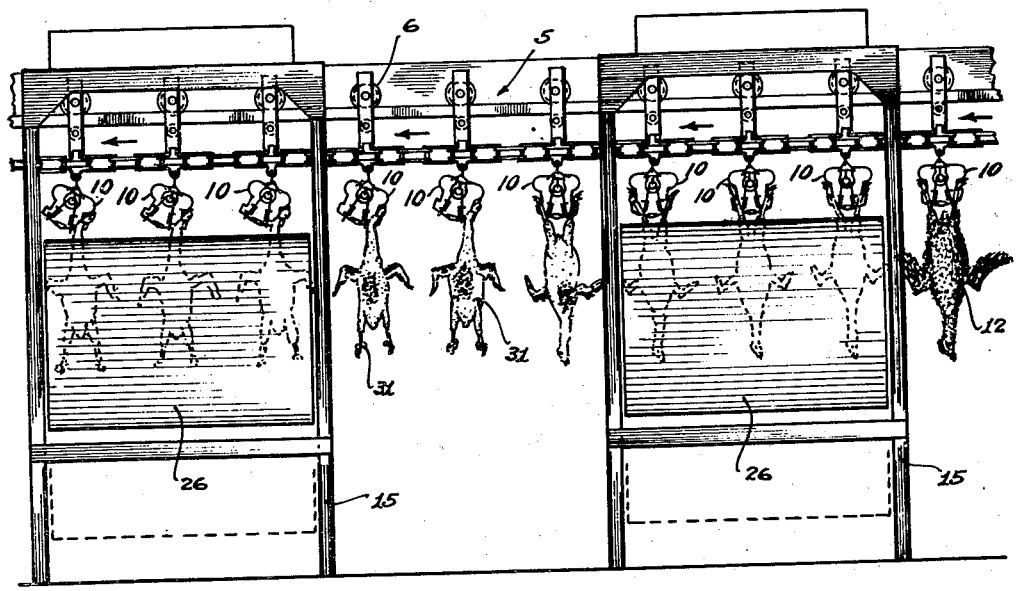
Figure 1 shows one embodiment of the invention utilizing two mechanical picking machines in connection with which the poultry passing through the first machine are suspended from their feet and thereafter they are reversed so that they are suspended from their heads and then passed through a second picking machine.
Figure 2:
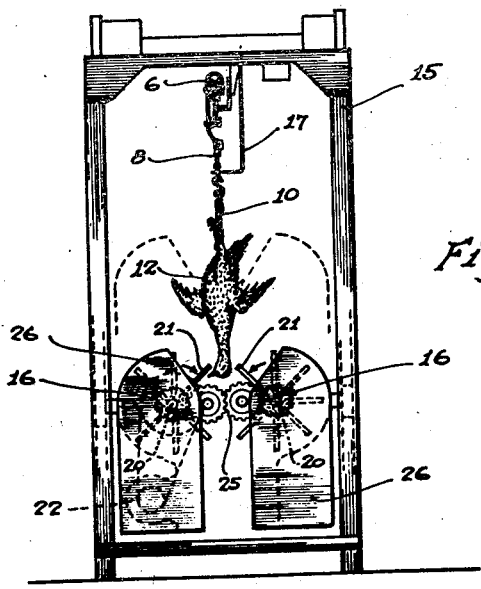
Figure 2 is a vertical section through the conveyor line of Figure 1, showing the picking machine in a lowered position.

Referring to the drawings, the numeral 5 indicates a conveyor line along which the trolleys 6 are propelled at a uniform rate by a source of power not shown. Suspended on the trolleys is a chain 8 for carrying the poultry along the dressing line. Detachable shackles 10 adapted for carrying birds 12 may be hooked at intervals on the chain 8. The shackles may be any well known or preferred type. A shackle contemplated is that shown in the De Vout Patent No. 2,035,948, or a modification thereof. Thus, by inserting the head of the carcass in one of the recesses in place of one of the feet, the shackle disclosed in the De Vout Patent 2,035,948 may be used to suspend a poultry carcass by the head. In the drawing the picking machines are shown as the automatic type comprising a pair of parallel horizontal rotors equipped with picking fingers and a means for automatically elevating the rotors at intervals into a picking position. A suitable automatic picking machine is one of the type shown in the Barker Patent, U. S. No. 2,328,770. In Figures 1 and 3 the picking rotors are shown in an elevated picking position, whereas in Figure 2 the rotors are shown in a lowered position out of contact of the poultry. The rotors are automatically raised at intervals to accomplish the picking as the birds travel continuously along the conveyor line in the direction of the arrows. The rotors are lifted to a picking position at intervals in order to accomplish the picking in a brief interval of time insufficient to cause any damage to the fowls.

The picking machine comprises a frame 15, the vertical sections of which compose a track or guide for elevating the rotors 16. The movement of the rotors up and down is determined by a switch 17, Figure 2, actuated by shackles conveying the birds traveling on the conveyor. Thus, the birds entering a picking position over the rotors trip the switch 17 whereby the rotors move upward into a picking position for a predetermined interval of time and then recede out of the picking position. The rotors comprise drums 20 on which are mounted fingers 21 of flexible material such as rubber. The rotors are driven by a motor 22 through a gear arrangement 25. One of the rotors travels in a clockwise and the other in a counter-clockwise direction so that the picking fingers strike downward on the bird and exert a pulling action on the feathers. The rotors may be mounted in housing 26 to catch the feathers so that they will fall substantially below the picking machine.

In the operation of the invention with the apparatus shown in Figure 1, the birds from the scalding vat (not shown) travel along the chain 8 in the direction of the arrows to the first of the picking machines 15. The birds, at this stage, are suspended from the feet. As the birds enter the picking machine, shackles trip the switch 17 which actuates the power mechanism to cause the rotors to elevate so that they are substantially on a plane with the bodies of the bird. The fingers envelop substantially the entire feathered portion of the birds and rapidly pull off the feathers. The machine is lowered out of a picking position in the course of several seconds and remains in the lowered position until the next shackle throws the switch. With a machine of the size of that shown in the drawing, each bird is subjected to two picking operations as it passes through the machine, although the number of the picking operations may vary depending on the size of the machine.

Heretofore the aforesaid operation has constituted the only mechanical picking operation applied to the birds. It is usual for the birds which have once passed through the picking machine in this manner to have a substantial amount of feathers on the back and on the lower side of the wings, as shown in Figure 4. These feathers are protected from the downward striking of the fingers by the topside 28 of the wings and by the hip bones 30 of the fowl. These feathers heretofore have been partly removed by operators standing at the outlet end of the picking machine. The picked birds have then been passed through drying tunnels and through the waxing operations to remove the remaining feathers and hairs.

According to the present invention the birds emerging from the first picking machine are removed from the shackles and reversed so that they are hanging from the head, as shown by the birds 31 in Figure 1. This reversal of the birds may be done by removing the feet from the shackle and placing the head in the shackle or by removing the shackle from the chain and from the feet and inserting another shackle around the head and hanging the shackles and birds again on the chain. By reversing the birds so that the heads are up it will be observed that the back and the back of the wings are pointing upwards so that they are no longer protected from the fingers of the picking machine as they were when the birds were hanging from the feet. The birds, hanging from the head, are then passed through another picking machine which operates substantially as described before in connection with the first machine. The embodiment of the invention just described is preferable where two machines are available or where there is insufficient room around the machines whereby the operation to be described in connection with Figure 3 is impractical.

In practicing the invention with the apparatus shown in Figure 3 the birds from the scalding tank are hung by their feet on every other shackle, leaving a vacant shackle between two adjacent birds. As the birds emerge from the picking machine the operator removes them from the shackle and hangs the bird by the head on the vacant shackle at the entrance of the picking machine. The operator may walk around the machine along the path indicated by the arrow in making the foregoing change with the birds. The birds now hanging by the head pass again through the same picking machine. This type of operation is preferable where there is only one machine available and where there is sufficient room around the machine for the operator to walk. Instead of the operator walking around the machine with the bird, the conveyor may be in a U-shape so that the conveyor line with the vacant shackles pass by the operator at the end of the picking machine. The operation of the invention with the apparatus of Figure 3 is somewhat slower and the number of birds picked per hour may be substantially less than that accomplished with the apparatus shown in Figure 1. It may be possible to pick birds at the rate of several hundred an hour with the apparatus in Figure 3 whereas with the apparatus of Figure 1, it is possible to pick birds at the rate of up to one thousand or more per hour.

While I have described a particular type of automatic picking machine, the invention is not restricted to such a machine since other types of picking machines may be used. For example, instead of using a machine in which the rotors are lifted up to a picking position around the bird, it is possible to use a machine wherein the rotors are stationary and the birds are lowered into the picking machine or the rotors are stationary and the birds pulled through on chain by the head. Also the principles of my invention may be utilized with other types of picking machines than the automatic.

As an example of the operation of the invention, spring friers were hung from shackles on a conveyor which traveled at a rate sufficient to handle about 300 chickens per hour. A vacant shackle was left between two adjacent chickens. The chickens were first killed and stuck. After bleeding a few seconds, the chickens were scalded and then immediately passed through an automatic picking machine. As the chickens emerged from the picking machine the feet were removed from the shackles, the head reversed and the chickens suspended from the head of the vacant shackles. The chickens suspended from the head were again passed through the same picking machine. The chickens so treated were found to be substantially free of feathers and required no further picking operations, such as the application of wax, to render the picked chickens acceptable for marketing. Chickens similarly treated but passed through the picking machine suspended from the legs only were found to contain a substantial amount of feathers on the back and on the lower sides of the wings. It was necessary to subject the latter chickens to further treatment to remove the feathers, including the steps of drying and waxing.

As another example of the invention, fowls were treated substantially as described in the example above, except that the conveyor was run at a speed to take care of about 600 fowls per hour. The fowls, on emerging from the first picking machine were reversed by an operator and suspended by the heads. They were then passed through a second picking machine. The fowl so treated were completely picked and satisfactory for marketing except for a slight singeing operation.

The present invention has the advantage of providing a means for completely defeathering poultry by mechanical picking. The process greatly simplifies the equipment and the steps required in defeathering fowls. It has been demonstrated that the use of wax which has been considered necessary heretofore to remove the remnants of the feathers and hairs, may be eliminated by the present invention. Also, the treatment of the fowls, such as drying and the applying and removing of the wax to the surface of the carcass is unnecessary, whereby any damage to the surface of the carcass and the possibility of leaving particles of wax on the surface of the carcass are avoided. Furthermore, it has been found that the color of the surface of birds picked by my method is brighter than that of birds picked by methods heretofore.

Obviously, many modifications and variations of the invention hereinbefore set forth may be made without distinguishing from the spirit and scope thereof, and therefore, only such limitations should be imposed as are indicated in the appended claims.

I claim:

1. A method of defeathering poultry comprising mechanically suspending a carcass in a predetermined vertical position, conveying the same along a predetermined fixed path past a picking station, applying a picking force in one direction with respect to the lay of the feathers to substantially the entire area of the carcass at said picking station, thereafter again mechanically conveying said carcass, while suspended in a predetermined vertical position, along a predetermined fixed path past a picking station and applying a picking force thereto in the opposite direction with respect to the lay of the feathers to substantially the entire area of the carcass while at said picking station.

2. A method of defeathering poultry comprising mechanically suspending a carcass in a predetermined vertical position, conveying the same along a predetermined fixed path past a picking station, applying a picking force in one direction with respect to the lay of the feathers to substantially the entire area of the carcass at said picking station, thereafter suspending the carcass in the reversed vertical position, conveying the same along a predetermined fixed path past a second picking station and applying a picking force thereto in the opposite direction with respect to the lay of the feathers to substantially the entire area of the carcass while at said second picking station.

3. A method of defeathering poultry comprising mechanically suspending a carcass in a predetermined position, conveying the same along a predetermined fixed path past a picking station, applying a picking force in one direction with respect to the lay of the feathers to a substantial area of the carcass at said picking station, thereafter again mechanically conveying said carcass, while suspended in a predetermined position, along a predetermined fixed path past a picking station and applying a picking force thereto in the opposite direction with respect to the lay of the feathers to said substantial area of the carcass while at said picking station.

4. The method defined in claim 3 wherein said picking forces are applied substantially longitudinally of said carcass.

5. The method defined in claim 3 wherein the first-mentioned picking force is applied to said carcass against the lay of the feathers.

6. The method defined in claim 3 wherein the first-mentioned picking force is applied to said carcass with the lay of the feathers.

7. The method defined in claim 3 including the step of inverting said carcass on said mechanical holding and conveying means after the application of said first-mentioned picking force.

8. The method defined in claim 3 including the step of inverting said carcass on said mechanical holding and conveying means after the application of said first-mentioned picking force, and wherein said second-mentioned picking force is applied at said first-mentioned station.

9. A method of defeathering poultry, comprising: mechanically suspending a carcass in a predetermined vertical position, conveying said carcass along a predetermined fixed path past a picking station; applying a picking force to a substantial area of said carcass at the said station by oppositely disposed mechanical picking means while said carcass is held and conveyed in said predetermined manner and before picking said area in another direction, said picking force acting substantially longitudinally of said carcass in one direction with respect to the lay of the feathers; and thereafter mechanically conveying said carcass, while suspended in a predetermined vertical position, along a predetermined fixed path in a predetermined manner past a picking station, applying a picking force to said substantial area at the said station by mechanical picking means, the last said picking force acting substantially longitudinally of said carcass in substantially the opposite direction with respect to the lay of the feathers.

10. A method of defeathering poultry, comprising: mechanically suspending a carcass in a predetermined vertical position, conveying said carcass along a predetermined fixed path past a picking station; applying a picking force to a substantial area of said carcass between the neck and feet at the said station by oppositely disposed mechanical picking means while said carcass is held and conveyed in said predetermined manner and before picking said area in another direction, said picking force acting substantially longitudinally of said carcass in one direction with respect to the lay of the feathers; and thereafter mechanically conveying said carcass while suspended in a predetermined vertical position, along a predetermined fixed path in a predetermined manner past a picking station, applying a picking force to said substantial area at the said station by mechanical picking means, the last said picking force acting substantially longitudinally of said carcass in substantially the opposite direction with respect to the lay of the feathers.

11. A method of defeathering poultry, comprising: mechanically suspending a carcass in a predetermined vertical position, conveying said carcass along a predetermined fixed path in a predetermined manner past a picking station; applying a picking force to substantially the entire area of said carcass between the neck and feet at said station by oppositely disposed mechanical picking means while said carcass is held and conveyed in said predetermined manner and before applying to the entire said carcass a second picking force acting in another direction, said first picking force acting substantially longitudinally of said carcass in one direction with respect to the lay of the feathers; and thereafter mechanically conveying said carcass, while suspended in a predetermined vertical position, along a predetermined fixed path in a predetermined manner past a picking station, applying a second picking force to substantially the entire area of said carcass between the head and feet at said station by oppositely disposed mechanical picking means, the last said picking force acting substantially longitudinally of said carcass in substantially the opposite direction with respect to the lay of the feathers.

ELMER M. DAVIS.

REFERENCES CITED

The following references are of record in the file of this patent:

UNITED STATES PATENTS

| Number | Name | Date |
|---|---|---|
| 1,217,393 | Berg | Feb. 27, 1917 |
| 1,375,595 | Bouda | Mar. 22, 1921 |
| 1,755,665 | Richards | Apr. 22, 1930 |
| 1,889,228 | Swanson | Nov. 29, 1932 |
| 1,943,450 | Molyneaux | Jan. 16, 1934 |
| 2,328,770 | Barker | Sept. 7, 1943 |